United States Patent
Liu et al.

(10) Patent No.: US 12,531,794 B2
(45) Date of Patent: Jan. 20, 2026

(54) TRAFFIC IDENTIFICATION METHOD AND TRAFFIC IDENTIFICATION DEVICE

(71) Applicant: Huawei Technologies Co., Ltd., Shenzhen (CN)

(72) Inventors: Wenqian Liu, Nanjing (CN); Xinyu Hu, Nanjing (CN); Jun Wu, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 441 days.

(21) Appl. No.: 18/050,775

(22) Filed: Oct. 28, 2022

(65) Prior Publication Data

US 2023/0079312 A1   Mar. 16, 2023

Related U.S. Application Data

(63) Continuation of application No. PCT/CN2021/083803, filed on Mar. 30, 2021.

(30) Foreign Application Priority Data

Apr. 30, 2020   (CN) .......................... 202010362612.0

(51) Int. Cl.
*H04L 43/026* (2022.01)
*H04L 45/00* (2022.01)

(52) U.S. Cl.
CPC ............ *H04L 43/026* (2013.01); *H04L 45/38* (2013.01)

(58) Field of Classification Search
CPC .............................. H04L 43/026; H04L 45/38

USPC ......................................................... 370/252
See application file for complete search history.

(56) References Cited

U.S. PATENT DOCUMENTS

| | | | | |
|---|---|---|---|---|
| 2011/0019581 A1* | 1/2011 | Chin | ..................... | H04L 43/18 |
| | | | | 370/253 |
| 2022/0146689 A1* | 5/2022 | Newman | ................. | H04W 4/46 |
| 2024/0259370 A1* | 8/2024 | Yang | ................... | H04L 63/0861 |

FOREIGN PATENT DOCUMENTS

| | | |
|---|---|---|
| CN | 101814977 A | 8/2010 |
| CN | 107360032 A | 11/2017 |
| CN | 107431663 A | 12/2017 |
| CN | 109412900 A | 3/2019 |
| CN | 109862392 A | 6/2019 |
| CN | 110443657 A | 11/2019 |
| WO | 2019223553 A1 | 11/2019 |

OTHER PUBLICATIONS

Zhigen. H. et al., "One kind of traffic classification method based on packet length and packet inter-arrival time", Electronic Measurement Technology, Nov. 2011, 5 Pages.
(Continued)

*Primary Examiner* — Hermon Asres
(74) *Attorney, Agent, or Firm* — Slater Matsil, LLP

(57) ABSTRACT

Embodiments of this application disclose a traffic identification method and a traffic identification device. The method in embodiments of this application includes: The traffic identification device obtains to-be-analyzed traffic of a target data flow. The traffic identification device obtains arrival time intervals of packets of the to-be-analyzed traffic. The traffic identification device determines a type of the to-be-analyzed traffic based on a distribution feature of probabilities of a part or all of the arrival time intervals.

20 Claims, 5 Drawing Sheets

(56) References Cited

OTHER PUBLICATIONS

Zeng Fanchao et al., "Research and Application of VoIP Feature Recognition", May 5, 2015 total:1page.
Xia'an, B. et al., "Efficient technology for identifying and classifying game traffic", Computer Engineering and Applications, Jul. 27, 2010, 4 Pages.
Xu-Gang, L. et al., "Scheme for identification of media gateways in VoIP based on statistical flow characteristic", Application Research of Computers, Dec. 2011, 5 Pages, vol. 28, No. 12.
Yangyang, S. et al., "P2P traffic identification method based on clustering and Traffic Dispersion Graph", Application Research of Computers, Jul. 29, 2018, 7 Pages.
Do, L. et al., "Real Time VoIP Traffic Classification", CAIA Technical Report 090914A, Jul. 2009, 3 Pages.
Rui, Z. et al., "Feature analysis and recognition of game traffic", Computer Engineering and Applications, Sep. 15, 2015, 7 Pages.
Vladislav Petkov et al., "Characterizing per-application network traffic using entropy", ACM Transactions on Modeling and Computer Simulation, ACM, New York, NY, US, vol. 23, No. 2, May 10, 2013, XP058018270, total 25 pages.
Majumdar, Chitradeep et al., "Accurate Modelling of IOT Data Traffic Based on Weighted Sum of Distributions", ICC 2019-2019 IEEE International Conference on Communications (ICC), IEEE, May 20, 2019, XP033581870, total 6 pages.

\* cited by examiner

TRAFFIC IDENTIFICATION METHOD AND TRAFFIC IDENTIFICATION DEVICE

CROSS-REFERENCE TO RELATED APPLICATIONS

This application is a continuation of International Application No. PCT/CN2021/083803, filed on Mar. 30, 2021, which claims priority to Chinese Patent Application No. 202010362612.0 filed on Apr. 30, 2020. The disclosures of the aforementioned applications are hereby incorporated by reference in their entireties.

TECHNICAL FIELD

This application relates to the communication field, and in particular, to a traffic identification method and a traffic identification device.

BACKGROUND

An online game service develops rapidly around the world, and a quantity of users keeps increasing. A traffic identification device analyzes a feature of a packet extracted from game traffic and uses a machine learning and statistical learning method to infer an application type of a service, to ensure the service. Therefore, how to accurately identify traffic of the online game service, implement network management and network planning, and improve quality of a network service becomes a research focus in the field of network management.

Currently, the traffic identification device captures a session packet carrying a keyword, extracts tuple information of both communication parties from the session packet, and establishes a 5-tuple rule base. Then, the traffic identification device uses a traffic classification algorithm to perform 5-tuple prefix matching on the packet included in the traffic, and identifies and classifies the game traffic by using a matching algorithm.

It can be learned from the foregoing solution that the traffic identification device identifies and classifies the traffic by performing 5-tuple prefix matching on the packet included in the traffic. However, when addresses of both the communication parties change, accuracy of identifying the game traffic by using the tuple information of both the communication parties is low, and the game traffic cannot be accurately identified.

SUMMARY

Embodiments of this application provide a traffic identification method and a traffic identification device, to accurately identify game traffic and improve accuracy of identification on the game traffic.

A first aspect of embodiments of this application provides a traffic identification method. The method includes the following.

The traffic identification device obtains to-be-analyzed traffic of a target data flow. Then, the traffic identification device obtains arrival time intervals of packets of the to-be-analyzed traffic, and determines a type of the to-be-analyzed traffic based on a distribution feature of probabilities of a part or all of the arrival time intervals.

In this embodiment, distribution of probabilities of arrival time intervals of packets of traffic of each type has a specific distribution rule. Therefore, the traffic identification device can accurately identify the type of the to-be-analyzed traffic based on the distribution feature of the probabilities of the arrival time intervals of the packets of the to-be-analyzed traffic. For example, when the distribution feature of the probabilities of the all or a part of the arrival time intervals of the packets of the to-be-analyzed traffic is consistent with a distribution feature of probabilities of packets of game traffic, the traffic identification device can determine that the to-be-analyzed traffic is the game traffic, to accurately identify the game traffic and improve accuracy of identification on the game traffic.

In a possible implementation, that the traffic identification device determines a type of the to-be-analyzed traffic based on a distribution feature of probabilities of a part or all of the arrival time intervals includes: The traffic identification device determines the type of the to-be-analyzed traffic based on a similarity between the distribution feature of the probabilities of the part or all of the arrival time intervals and a distribution feature of probabilities of arrival time intervals of packets of historical traffic of a first type.

In this possible implementation, a specific manner in which the traffic identification device identifies the type of the to-be-analyzed traffic is provided. Whether the to-be-analyzed traffic is traffic of the first type is determined by using a similarity between the distribution feature of the probabilities of the arrival time intervals of the packets of the to-be-analyzed traffic and a distribution feature of probabilities of arrival time intervals of packets of traffic of a known type.

In another possible implementation, that the traffic identification device determines the type of the to-be-analyzed traffic based on a similarity between the distribution feature of the probabilities of the part or all of the arrival time intervals and a distribution feature of probabilities of arrival time intervals of packets of historical traffic of a first type includes: The traffic identification device determines, when the similarity is higher than a first similarity, that the to-be-analyzed traffic is the traffic of the first type.

In this possible implementation, a specific implementation of determining the type of the to-be-analyzed traffic by determining magnitude of the similarity is provided, to improve implementability of a solution.

In another possible implementation, the similarity is represented by a fitting degree between the distribution feature of the probabilities of the part or all of the arrival time intervals and a reference time interval probability distribution model. The reference time interval probability distribution model is used to represent the distribution feature of the probabilities of the arrival time intervals of the packets of the historical traffic of the first type. That the traffic identification device determines that, when the similarity is higher than a first similarity, the to-be-analyzed traffic is the traffic of the first type includes: The traffic identification device determines that the to-be-analyzed traffic is the traffic of the first type when the fitting degree is higher than a first fitting degree.

In this possible implementation, the similarity is represented by the fitting degree between the distribution feature of the probabilities of the part or all of the arrival time intervals and the reference time interval probability distribution model. In this way, the to-be-analyzed traffic can be identified by determining magnitude of the fitting degree.

In another possible implementation, the fitting degree is represented by using a reciprocal of relative entropy and a Kolmogorov-Smirnov (KS) test amount. When the reciprocal of the relative entropy is equal to a first preset threshold and the KS test amount is equal to a second preset threshold, the fitting degree is the first fitting degree. When the reciprocal of the relative entropy is greater than the first preset threshold and the KS test amount is less than the second preset threshold, the fitting degree is higher than the first fitting degree.

In this possible implementation, two specific parameters representing the fitting degree are provided, and a fitting degree between the distribution feature of the probabilities of the part or all of the arrival time intervals and the distribution feature of the probabilities of the arrival time intervals of the packets of the historical traffic of the first type is determined based on ranges into which the two specific parameters fall. When the similarity is higher than the first similarity, the traffic identification device determines that the to-be-analyzed traffic is the traffic of the first type.

In another possible implementation, that the traffic identification device determines the type of the to-be-analyzed traffic based on a similarity between the distribution feature of the probabilities of the part or all of the arrival time intervals and a distribution feature of probabilities of arrival time intervals of packets of historical traffic of a first type includes: The traffic identification device computes a fitting parameter based on the part or all of the arrival time intervals, the probabilities of the part or all of the arrival time intervals, and the reference time interval probability distribution model. The reference time interval probability distribution model is used to represent the distribution feature of the probabilities of the arrival time intervals of the packets of the historical traffic of the first type. The fitting parameter is used to indicate the fitting degree between the distribution feature of the probabilities of the part or all of the arrival time intervals and the reference time interval probability distribution model. The traffic identification device determines the type of the to-be-analyzed traffic based on the fitting parameter.

In this possible implementation, an implementation of representing the similarity by using the fitting parameter and a specific implementation of computing the fitting parameter are shown. The fitting parameter represents the fitting degree between the distribution feature of the probabilities of the part or all of the arrival time intervals and the reference time interval probability distribution model, to accurately determine the type of the to-be-analyzed traffic by using the fitting parameter, so as to improve accuracy of traffic identification.

In another possible implementation, the fitting parameter includes the reciprocal of the relative entropy and the KS test amount. That the traffic identification device determines the type of the to-be-analyzed traffic based on the fitting parameter includes: The traffic identification device determines that the to-be-analyzed traffic is the traffic of the first type when determining that the reciprocal of the relative entropy is greater than the first preset threshold and the KS test amount is less than the second preset threshold.

In this possible implementation, parameters in two specific forms of the fitting parameter are provided, which are respectively the reciprocal of the relative entropy and the KS test amount. A process of identifying the type of the to-be-analyzed traffic by using the reciprocal of the relative entropy and the KS test amount is shown, to improve implementability of the solution.

In another possible implementation, the traffic of the first type is the game traffic or video traffic.

In this possible implementation, the traffic identification method in embodiments of this application is applicable to identification on the game traffic and/or identification on the video traffic, and is further applicable to identification on traffic of another type.

In another possible implementation, the method further includes: The traffic identification device obtains the historical traffic of the first type. The traffic identification device obtains the arrival time intervals of the packets of the historical traffic and the probabilities of the arrival time intervals of the packets of the historical traffic. The traffic identification device establishes the reference time interval probability distribution model based on the arrival time intervals of the packets of the historical traffic and the probabilities of the arrival time intervals of the packets of the historical traffic.

In this possible implementation, the traffic identification device may further establish the reference time interval probability distribution model based on the arrival time intervals of the packets of the historical traffic and the probabilities of the arrival time intervals of the packets of the historical traffic. In this way, whether the to-be-analyzed traffic is the traffic of the first type can be determined by using a similarity between the reference time interval probability distribution model and the distribution feature of the probabilities of the part or all of the arrival time intervals of the packets of the to-be-analyzed traffic, to accurately identify the type of the to-be-analyzed traffic.

In another possible implementation, the reference time interval probability distribution model includes any one of the following: a power-law distribution model, a Gaussian distribution model, a normal distribution model, and a Poisson distribution model.

In this possible implementation, a plurality of possible forms of the reference time interval probability distribution model are provided. When the reference time interval probability distribution model is selected, a model that is consistent with a distribution feature of probabilities of arrival time intervals of packets corresponding to a traffic type should be selected with reference to the traffic type and an experimental result. For example, for the game traffic, a distribution feature of probabilities of arrival time intervals of packets of the game traffic is consistent with a distribution feature of the power-law distribution model. Therefore, the traffic identification device may select the power-law distribution model as the reference time interval probability distribution model.

In another possible implementation, when the traffic identification device determines the type of the to-be-analyzed traffic based on the distribution feature of the probabilities of the part of the arrival time intervals, the part of the arrival time intervals are arrival time intervals that are less than a third preset threshold in the arrival time intervals of the packets of the to-be-analyzed traffic.

In this possible implementation, because the arrival time intervals of the packets of the game traffic or the video traffic are small, a distribution feature of probabilities of arrival time intervals that are small in the arrival time intervals of the packets of the to-be-analyzed traffic may represent the type of the to-be-analyzed traffic to some extent.

In another possible implementation, the method further includes: The traffic identification device determines a first packet of the to-be-analyzed traffic. An arrival time interval of the first packet is less than the third preset threshold. The traffic identification device determines a ratio of a quantity of the first packets to a total quantity of packets included in the to-be-analyzed traffic. When the traffic identification device determines that the ratio is greater than a fourth preset threshold, the traffic identification device triggers performing of the step that the traffic identification device determines a type of the to-be-analyzed traffic based on a distribution feature of probabilities of a part or all of the arrival time intervals.

In this possible implementation, by using a preliminary traffic screening process performed by the traffic identification device in the foregoing solution, the traffic identification can be prevented from further identifying all network traffic that flows through the traffic identification device, to improve efficiency of the traffic identification.

A second aspect of embodiments of this application provides a traffic identification device. The traffic identification device includes: a first obtaining unit, configured to obtain to-be-analyzed traffic of a target data flow; a second obtaining unit, configured to obtain arrival time intervals of packets of the to-be-analyzed traffic; and a first determining unit, configured to determine a type of the to-be-analyzed traffic based on a distribution feature of probabilities of a part or all of the arrival time intervals.

In a possible implementation, the first determining unit is specifically configured to: determine the type of the to-be-analyzed traffic based on a similarity between the distribution feature of the probabilities of the part or all of the arrival time intervals and a distribution feature of probabilities of arrival time intervals of packets of historical traffic of a first type.

In another possible implementation, the first determining unit is specifically configured to: determine, when the similarity is higher than a first similarity, that the to-be-analyzed traffic is traffic of a first type.

In another possible implementation, the similarity is represented by a fitting degree between the distribution feature of the probabilities of the part or all of the arrival time intervals and a reference time interval probability distribution model. The reference time interval probability distribution model is used to represent the distribution feature of the probabilities of the arrival time intervals of the packets of the historical traffic of the first type. The first determining unit is specifically configured to: determine that the to-be-analyzed traffic is the traffic of the first type when the fitting degree is higher than a first fitting degree.

In another possible implementation, the fitting degree is represented by using a reciprocal of relative entropy and a KS test amount. When the reciprocal of the relative entropy is equal to a first preset threshold and the KS test amount is equal to a second preset threshold, the fitting degree is the first fitting degree. When the reciprocal of the relative entropy is greater than the first preset threshold and the KS test amount is less than the second preset threshold, the fitting degree is higher than the first fitting degree.

In another possible implementation, the first determining unit is specifically configured to: compute a fitting parameter based on the part or all of the arrival time intervals, the probabilities of the part or all of the arrival time intervals, and the reference time interval probability distribution model, where the reference time interval probability distribution model is used to represent the distribution feature of the probabilities of the arrival time intervals of the packets of the historical traffic of the first type, and the fitting parameter is used to indicate the fitting degree between the distribution feature of the probabilities of the part or all of the arrival time intervals and the reference time interval probability distribution model; and determine the type of the to-be-analyzed traffic based on the fitting parameter.

In another possible implementation, the fitting parameter includes the reciprocal of the relative entropy and the Kolmogorov-Smirnov (KS) test amount. The first determining unit is specifically configured to: determine that the to-be-analyzed traffic is the traffic of the first type when the traffic identification device determines that the reciprocal of the relative entropy is greater than the first preset threshold and the KS test amount is less than the second preset threshold.

In another possible implementation, the traffic of the first type is game traffic or video traffic.

In another possible implementation, the first obtaining unit is further configured to: obtain the historical traffic of the first type.

The second obtaining unit is further configured to: obtain the arrival time intervals of the packets of the historical traffic and the probabilities of the arrival time intervals of the packets of the historical traffic.

The traffic identification device further includes an establishment unit.

The establishment unit is configured to establish the reference time interval probability distribution model based on the arrival time intervals of the packets of the historical traffic and the probabilities of the arrival time intervals of the packets of the historical traffic.

In another possible implementation, the reference time interval probability distribution model includes any one of the following: a power-law distribution model, a Gaussian distribution model, a normal distribution model, and a Poisson distribution model.

In another possible implementation, when the first determining unit determines the type of the to-be-analyzed traffic based on the distribution feature of the probabilities of the part of the arrival time intervals, the part of the arrival time intervals are arrival time intervals that are less than a third preset threshold in the arrival time intervals of the packets of the to-be-analyzed traffic.

In another possible implementation, the traffic identification device further includes a second determining unit and a triggering unit.

The second determining unit is configured to: determine a first packet of the to-be-analyzed traffic, where an arrival time interval of the first packet is less than the third preset threshold; and determine a ratio of a quantity of the first packets to a total quantity of packets included in the to-be-analyzed traffic.

The triggering unit is configured to: when the traffic identification device determines that the ratio is greater than a fourth preset threshold, trigger the first determining unit to perform the step of determining the type of the to-be-analyzed traffic based on the distribution feature of the probabilities of the part or all of the arrival time intervals.

A third aspect of embodiments of this application provides a traffic identification device. The traffic identification device includes a processor, a memory, an input/output device, and a bus. The memory stores computer instructions. When the processor executes the computer instructions in the memory, the memory stores the computer instructions. When executing the computer instructions in the memory, the processor is configured to implement any implementation of the first aspect.

In a possible implementation of the third aspect, the processor, the memory, and the input/output device are separately connected to the bus.

A fourth aspect of embodiments of this application provides a chip system. The chip system includes a processor that is configured to support a network device in implementing a function in the first aspect, for example, sending or processing data and/or information in the foregoing methods. In a possible design, the chip system further includes a memory. The memory is configured to store program instructions and data that are necessary for the network device. The chip system may include a chip, or may include a chip and another discrete component.

A fifth aspect of embodiments of this application provides a computer program product including instructions. When the computer program product runs on a computer, the computer is enabled to perform any implementation of the first aspect.

A sixth aspect of embodiments of this application provides a computer-readable storage medium, including instructions. When the instructions are run on a computer, the computer is enabled to perform any implementation of the first aspect.

It can be learned from the foregoing technical solutions that embodiments of this application have the following advantages.

It can be learned from the foregoing technical solution that the traffic identification device obtains the to-be-analyzed traffic of the target data flow. Then, the traffic identification device obtains the arrival time intervals of the packets of the to-be-analyzed traffic, and determines the type of the to-be-analyzed traffic based on the distribution feature of the probabilities of the part or all of the arrival time intervals. Distribution of probabilities of arrival time intervals of packets of traffic of each type has a specific distribution rule. Therefore, the traffic identification device can accurately identify the type of the to-be-analyzed traffic based on the distribution feature of the probabilities of the arrival time intervals of the packets of the to-be-analyzed traffic. For example, when the distribution feature of the probabilities of all or the part of the arrival time intervals of the packets of the to-be-analyzed traffic is consistent with the distribution feature of the probabilities of the packets of the game traffic, the traffic identification device can determine that the to-be-analyzed traffic is the game traffic, to accurately identify the game traffic and improve accuracy of identification on the game traffic.

DETAILED DESCRIPTION OF ILLUSTRATIVE EMBODIMENTS

Embodiments of this application provide a traffic identification method and a traffic identification device, to accurately identify game traffic and improve accuracy of identification on the game traffic.

Figure 1:
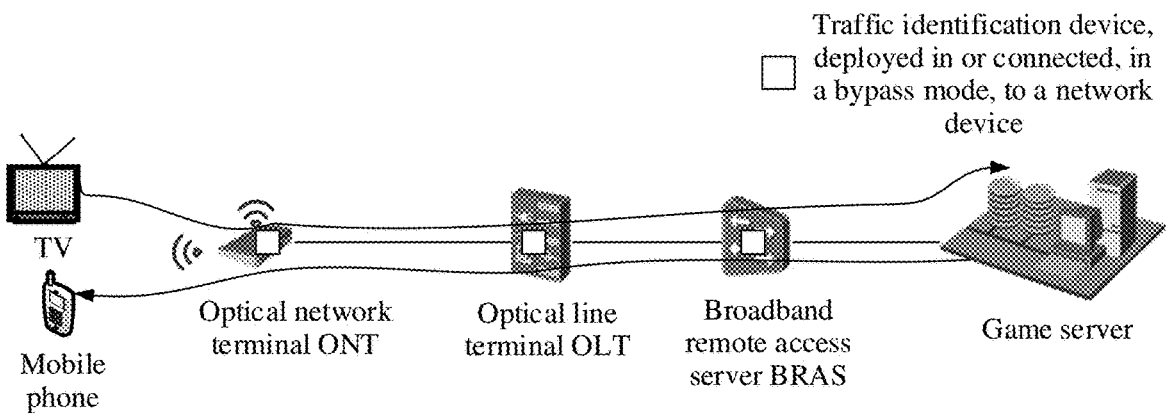
FIG. 1 is a schematic diagram of a framework according to an embodiment of this application.

FIG. 1 is a schematic diagram of a framework according to an embodiment of this application. As shown in FIG. 1, game traffic of a game service flow passes through a network device at each layer in a network in a network transmission process. For example, if a game server sends the game service flow, the game traffic of the game service flow passes through a broadband remote access server (BRAS), an optical line terminal (OLT), and an optical network terminal (ONT) in FIG. 1. It can be learned that, on the network, the game traffic of the transmitted game service flow passes through the network device deployed at each layer, and the game traffic may be obtained from the network device deployed at each layer. Therefore, in the technical solutions of embodiments of this application, it is proposed that a traffic identification device is deployed in any of the network devices deployed at or connected, in a bypass mode, to each layer of the network at a single point or a plurality of points. The traffic identification device collects network traffic of various types of terminal devices (for example, a mobile phone, a personal computer, and a TV), and identifies the network traffic, to determine a type of the network traffic, so as to infer a service type corresponding to the network traffic by using a machine learning and statistical learning method, and perform service assurance based on a priority of the service type.

It should be noted that the traffic identification device is integrated into the network device deployed at each layer at the single point or the plurality of points, or may be connected to the network device deployed at each layer in the bypass mode. This is not specifically limited in this application.

FIG. 1 shows only an application scenario of identifying the game traffic, and is also applicable to a scenario that is not shown in this application and that has a similar requirement or a same requirement. This is not limited in this application. For example, the technical solutions in embodiments of this application are also applicable to an application scenario in which the traffic identification device is configured to identify video traffic. The technical solutions in embodiments of this application are further applicable to an application scenario in which the traffic identification device is configured to identify both the game traffic and the video traffic.

The following describes the technical solutions in embodiments of this application by using specific embodiments.

Figure 2A:
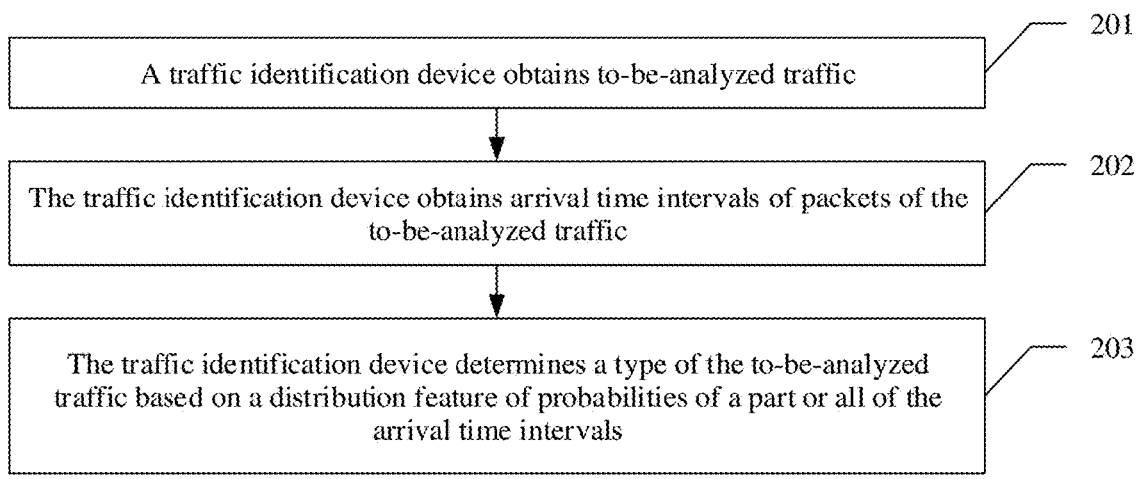
FIG. 2A is a schematic diagram of an embodiment of a traffic identification method according to an embodiment of this application.

FIG. 2A is a schematic diagram of an embodiment of a traffic identification method according to an embodiment of this application. In FIG. 2A, the method includes the following steps.

201: A traffic identification device obtains to-be-analyzed traffic of a target data flow.

For example, as shown in FIG. 1, an example in which the traffic identification device is integrated and deployed on the optical network terminal is used for description. When network traffic passes through the optical network terminal through transmission, the traffic identification device may obtain the network traffic. Then, the traffic identification device determines, based on a 5-tuple of the network traffic, that the network traffic belongs to traffic of the target data flow. In this case, the traffic identification device uses the network traffic as the to-be-analyzed traffic. Alternatively, the traffic identification device uses a part of traffic in the network traffic as the to-be-analyzed traffic. For example, the part of traffic includes first m packets in the network traffic, where m is an integer greater than 0.

It should be noted that, when the network traffic includes traffic of a plurality of data flows, the traffic identification device identifies the traffic of the target data flow from the network traffic by using the 5-tuple, and then uses a part or all of the traffic of the target data flow as the to-be-analyzed traffic.

For example, the network traffic includes traffic of a data flow A and traffic of a data flow B. The data flow A is the target data flow. The traffic identification device identifies the traffic of the data flow A from the network traffic by using the 5-tuple, and then uses a part or all of the traffic of the data flow A obtained through identifying as the to-be-analyzed traffic.

202: The traffic identification device obtains arrival time intervals of packets of the to-be-analyzed traffic.

An arrival time interval of packets is a time interval at which the traffic identification device consecutively receives two packets of a same data flow. Specifically, the arrival time interval of the packets may be an interval between a time at which the traffic identification device receives the packet and a time at which a next packet of the packet is received, or may be an interval between a time at which the traffic identification device receives the packet and a time at which a previous packet of the packet is received.

Figure 2B:
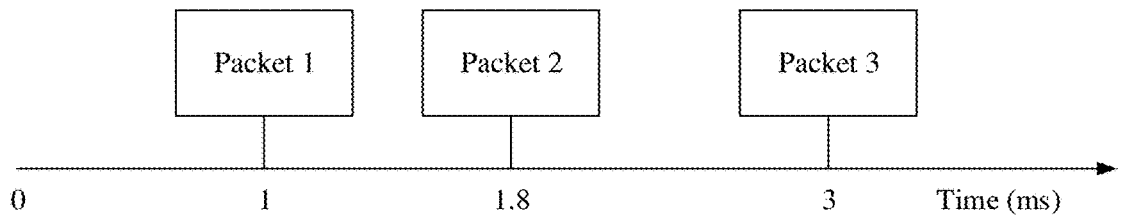
FIG. 2B is a schematic diagram of a scenario for a traffic identification method according to an embodiment of this application.

For example, as shown in FIG. 2B, a packet 1, a packet 2, and a packet 3 are three packets of the target data flow that are consecutively received by the traffic identification device. A time point at which the traffic identification device receives the packet 1 is a moment of 1 ms (millisecond). A time point at which the traffic identification device receives the packet 2 is a moment of 1.8 ms. A time point at which the traffic identification device receives the packet 3 is 3. In a possible implementation, an arrival time interval of the packet 2 may be understood as a time difference between the time point at which the traffic identification device receives the packet 3 and the time point at which the traffic identification device receives the packet 2, that is, the arrival time interval of the packet 2 is 1.2 ms. In another possible implementation, the arrival time interval of the packet 2 may be understood as a time difference between the time point at which the traffic identification device receives the packet 2 and a time point at which the traffic identification device receives the packet 1, that is, the arrival time interval of the packet 2 is 0.8 ms.

203: The traffic identification device determines a type of the to-be-analyzed traffic based on a distribution feature of probabilities of a part or all of the arrival time intervals of the packets of the to-be-analyzed traffic.

A probability of an arrival time interval refers to a probability that the arrival time interval occurs in the arrival time intervals of the packets of the to-be-analyzed traffic.

There are a plurality of manners for computing the probability of the arrival time interval. The following uses examples for description.

1. The probability of the arrival time interval is a ratio of a quantity of packets whose arrival time interval is the arrival time interval in the arrival time intervals of the packets of the to-be-analyzed traffic to a total quantity of the packets of the to-be-analyzed traffic.

For example, for a probability of an arrival time interval A, a total quantity of the packets of the to-be-analyzed traffic is M, and the M packets include N packets whose arrival time interval is A. In this case, it can be learned that the probability of the arrival time interval A is N/M. A is greater than 0, M is an integer greater than 0, and N is an integer greater than 0 and less than M.

2. The probability of the arrival time interval is a ratio of a quantity of arrival time intervals that are the arrival time interval in the arrival time intervals of the packets of the to-be-analyzed traffic to a total quantity of arrival time intervals in the arrival time intervals of the packets of the to-be-analyzed traffic. In other words, the probability of the arrival time interval is a ratio of a number of times of occurrence of the arrival time interval to a total number of times of occurrence of all arrival time intervals in the arrival time intervals of the packets of the to-be-analyzed traffic.

For example, for the probability of the arrival time interval A, the arrival time intervals of the packets of the to-be-analyzed traffic are respectively 1 ms, 2 ms, 2 ms, 3 ms, and 5 ms. The traffic identification device determines that the total quantity of the arrival time intervals of the packets of the to-be-analyzed traffic is 5. If the arrival time interval A is 2 ms, the traffic identification device determines that a quantity of arrival time intervals whose arrival time interval is 2 ms in the arrival time intervals of the packets of the to-be-analyzed traffic is 2. It can be learned that a probability of the arrival time interval 2 ms is 40%.

In this embodiment, the type of the to-be-analyzed traffic is traffic of a first type or traffic of a second type. The traffic of the first type includes game traffic, and the traffic of the second type is non-game traffic. Alternatively, the traffic of the first type is video traffic, and the traffic of the second type is non-video traffic. For example, the non-video traffic is download data traffic.

The part of the arrival time intervals of the packets of the to-be-analyzed traffic include an arrival time interval that is less than a third preset threshold in the arrival time intervals of the packets of the to-be-analyzed traffic.

For example, the arrival time intervals of the packets of the to-be-analyzed traffic are respectively 1 ms, 2 ms, 2 ms, 3 ms, 5 ms, 9 ms, 20 ms, and 30 ms. If the third preset threshold is 10 ms, the part of the arrival time intervals are 1 ms, 2 ms, 2 ms, 3 ms, and 5 ms. 1 ms, 3 ms, and 5 ms all occur once, and 2 ms occurs twice. Because arrival time intervals of packets of the game traffic or the video traffic are small, the traffic identification device may determine the type of the to-be-analyzed traffic based on a distribution feature of probabilities of arrival time intervals that are small in the arrival time intervals of the packets of the to-be-analyzed traffic.

For example, because a distribution feature of probabilities of the arrival time intervals of the packets of the game traffic is consistent with a distribution feature of a probability distribution model, when the traffic identification device determines that a similarity between the distribution feature of the probabilities of the part or all of the arrival time intervals and the distribution feature of the probability distribution model is high, the traffic identification device can determine that the to-be-analyzed traffic is the game traffic, to accurately identify the game traffic and improve accuracy of identification on the game traffic.

In this embodiment, optionally, Step 203 specifically includes Step 203a.

Step 203a: The traffic identification device determines the type of the to-be-analyzed traffic based on a similarity between the distribution feature of the probabilities of the part or all of the arrival time intervals of the packets of the to-be-analyzed traffic and a distribution feature of probabilities of arrival time intervals of packets of historical traffic of a first type.

Specifically, the traffic identification device may determine whether the to-be-analyzed traffic is the traffic of the first type based on the similarity between the distribution feature of the probabilities of the part or all of the arrival time intervals of the packets of the to-be-analyzed traffic and the distribution feature of the probabilities of the arrival time intervals of the packets of the historical traffic of the first type.

Optionally, when the similarity is higher than a first similarity, the traffic identification device determines that the to-be-analyzed traffic is the traffic of the first type.

In a possible implementation, the similarity is represented by a fitting degree between the distribution feature of the probabilities of the part or all of the arrival time intervals and a reference time interval probability distribution model. The reference time interval probability distribution model is used to represent the distribution feature of the probabilities of the arrival time intervals of the packets of the historical traffic of the first type. The first similarity corresponds to a first fitting degree. In this case, when the fitting degree is higher than the first fitting degree, the traffic identification device determines that the to-be-analyzed traffic is the traffic of the first type.

The fitting degree is represented by using a reciprocal of relative entropy and a KS test amount. When the reciprocal of the relative entropy is equal to a first preset threshold and the KS test amount is equal to a second preset threshold, the fitting degree is the first fitting degree. Correspondingly, when the reciprocal of the relative entropy is greater than the first preset threshold and the KS test amount is less than the second preset threshold, the fitting degree is higher than the first fitting degree.

For a process of computing the reciprocal of the relative entropy and the KS test amount, refer to related descriptions in subsequent Step 3001. Details are not described herein again.

In this embodiment of this application, the traffic identification device obtains the to-be-analyzed traffic of the target data flow. Then, the traffic identification device obtains the arrival time intervals of the packets of the to-be-analyzed traffic, and determines the type of the to-be-analyzed traffic based on the distribution feature of the probabilities of the part or all of the arrival time intervals. Distribution of probabilities of arrival time intervals of packets of traffic of each type has a specific distribution rule. Therefore, the traffic identification device can accurately identify the type of the to-be-analyzed traffic based on the distribution feature of the probabilities of the arrival time intervals of the packets of the to-be-analyzed traffic. For example, when the distribution feature of the probabilities of all or the part of the arrival time intervals of the packets of the to-be-analyzed traffic is consistent with the distribution feature of the probabilities of the packets of the game traffic, the traffic identification device can determine that the to-be-analyzed traffic is the game traffic, to accurately identify the game traffic and improve the accuracy of identification on the game traffic.

Figure 3A:
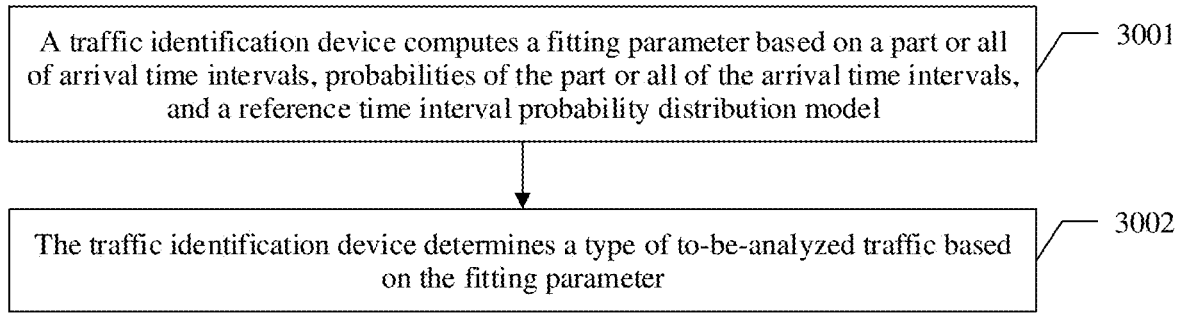
FIG. 3A is a schematic diagram of another embodiment of a traffic identification method according to an embodiment of this application.

In this embodiment of this application, optionally, Step 202a in the embodiment shown in FIG. 2A has a specific execution process, and Step 202a specifically includes Step 3001 and Step 3002. The following provides detailed descriptions with reference to an embodiment shown in FIG. 3A. FIG. 3A is a schematic diagram of another embodiment of a traffic identification method according to an embodiment of this application.

3001: The traffic identification device computes a fitting parameter based on the part or all of the arrival time intervals, the probabilities of the part or all of the arrival time intervals, and the reference time interval probability distribution model.

In this embodiment, the fitting parameter is used to indicate the fitting degree between the distribution feature of the probabilities of the part or all of the arrival time intervals and the reference time interval probability distribution model. The reference time interval probability distribution model is used to represent the distribution feature of the probabilities of the arrival time intervals of the packets of the traffic of the first type.

The reference time interval probability distribution model is a model obtained through training based on the historical traffic of the first type. The reference time interval probability distribution model is used by the traffic identification device to compute the fitting parameter based on the part or all of the arrival time intervals and the probabilities of the part or all of the time intervals.

Optionally, the fitting parameter includes a reciprocal r of relative entropy and/or a KS test amount p.

First, a process of computing the reciprocal r of the relative entropy is described. Herein, the distribution feature of the probabilities of the part or all of the arrival time intervals is represented as a function P(i). P(i) refers to an actually measured probability of an arrival time interval of an $i^{th}$ packet of the to-be-analyzed traffic received by the traffic identification device. The reference time interval probability distribution model is a function Q(i). Q(i) refers to a probability, computed by using the reference time interval probability distribution model, of the arrival time interval of the $i^{th}$ packet of the to-be-analyzed traffic received by the traffic identification device. The relative entropy is $$D_{KL}(P\square Q) = \sum_{i=1}^{n} P(i) \ln \frac{P(i)}{Q(i)} \cdot \sum_{i=1}^{n}(x)$$

refers to summing up x corresponding to 1 to n, and ln(a) refers to obtaining a logarithm of a through computing by using e as a bottom number. In this case, the reciprocal of the relative entropy is $r=1/D_{KL}(P\square Q)$.

Figure 3B:
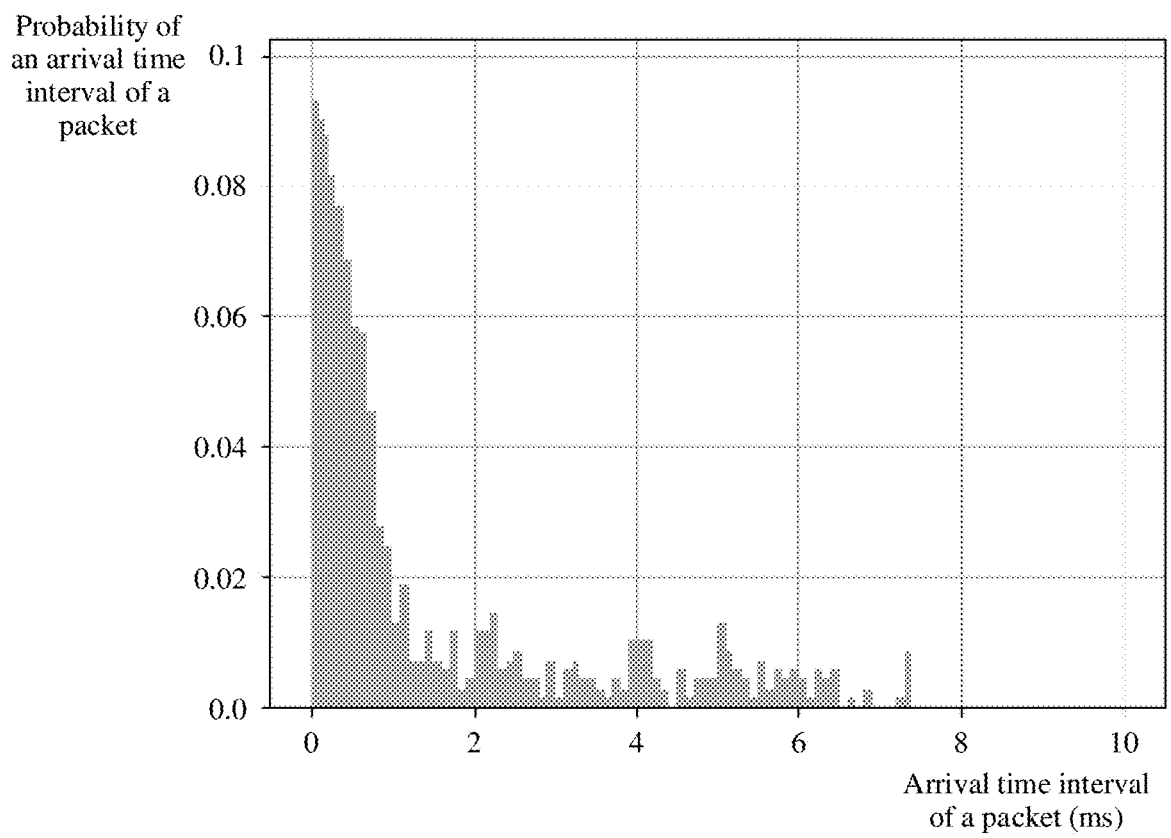
FIG. 3B is a schematic diagram of distribution of probabilities of arrival time intervals of packets of game traffic of a game application "Arena of Valor" according to an embodiment of this application.

For example, the arrival time intervals of the packets of the to-be-analyzed traffic and the probabilities of all of the arrival time intervals are specifically a distribution diagram shown in FIG. 3B. Horizontal coordinates are the arrival time intervals of the packets of the to-be-analyzed traffic, and vertical coordinates are the probabilities of all of the arrival time intervals. According to a time sequence in which the packets arrive at the traffic identification device, the traffic identification device uses arrival time intervals corresponding to n packets as an input parameter, inputs the arrival time intervals into the reference time interval probability distribution model, and computes to obtain reference probabilities of the arrival time intervals corresponding to the n packets. Then, the traffic identification device substitutes the arrival time intervals corresponding to the n packets, actually measured probabilities of the arrival time intervals of the n packets, and the reference probabilities of the arrival time intervals corresponding to the n packets into $$D_{KL}(P\Box Q) = \sum_{i=1}^{n} P(i) \text{ In } \frac{P(i)}{Q(i)},$$

and then computes a reciprocal r of $D_{KL}(P\Box Q)$, where n is an integer greater than 1.

The following describes a process of computing the KS test amount p. The distribution feature of the probabilities of the part or all of the arrival time intervals is represented as a function $F_N(x)$. $F_N(x)$ refers to an actually measured probability that an arrival time interval x occurs in the arrival time intervals of the packets of the to-be-analyzed traffic. The reference time interval probability distribution model is represented as a function $F(x)$. $F(x)$ is a probability, computed by using the reference time interval probability distribution model, that the arrival time interval x occurs in the arrival time intervals of the packets of the to-be-analyzed traffic. The traffic identification device determines that $p=D_n=\sup|F_N(x)-F(x)|$, where sup (b) is a function, and indicates that a maximum value of b is used. |c| indicates that an absolute value of c is used.

The to-be-analyzed traffic includes n packets. The traffic identification device separately uses arrival time intervals of the n packets as x and substitutes x into $F(x)$, to separately obtain a reference probability of an arrival time interval of each of the n packets. An actual probability of the arrival time interval of each packet (herein, the actual probability of the arrival time interval of each packet is an actual measured value obtained through actual measurement) is known. The traffic identification device computes an absolute value of a difference between the reference probability and the actual probability of the arrival time interval of each of the n packets. In this case, the traffic identification device obtains n absolute values corresponding to the n packets, and then determines a maximum value of the n absolute values. It can be learned that the maximum value is Dn, that is, p is obtained.

In this embodiment, the reference time interval probability distribution model may be the model that is obtained by the traffic identification device through training based on the historical traffic of the first type, or may be a model that is obtained by another device through training based on the historical traffic of the first type and that is configured on the traffic identification device. This is not specifically limited herein.

In this embodiment, the reference time interval probability distribution model includes a power-law distribution model, a Gaussian distribution model, a normal distribution model, or a Poisson distribution model. This is not specifically limited in this application.

In this embodiment of this application, when the reference time interval probability distribution model is selected, a model that is consistent with a distribution feature of probabilities of arrival time intervals of packets corresponding to a traffic type should be selected with reference to the traffic type and an experimental result. For example, for the game traffic, a distribution feature of probabilities of arrival time intervals of packets of the game traffic is consistent with a distribution feature of the power-law distribution model. Therefore, when identifying the game traffic, the traffic identification device may select the power-law distribution model as the reference time interval probability distribution model.

It should be noted that when the traffic identification device is configured to identify both the game traffic and the video traffic, a plurality of reference time interval probability distribution models are configured in the traffic identification device. For example, the plurality of reference time interval probability distribution models include a first time interval probability distribution model and a second time interval probability distribution model. The first time interval probability distribution model is used to represent the distribution feature of the probabilities of the arrival time intervals of the packets of the game traffic. The second time interval probability distribution model is used to represent a distribution feature of probabilities of arrival time intervals of packets of the video traffic.

When the traffic identification device identifies the to-be-analyzed traffic, the traffic identification device may first determine whether the to-be-analyzed traffic is game traffic based on a similarity between the first time interval probability distribution model and the distribution feature of the probabilities of the part or all the arrival time intervals. If the similarity is high, the traffic identification device determines that the to-be-analyzed traffic is the game traffic. If the similarity is low, the traffic identification device may determine whether the to-be-analyzed traffic is video traffic based on a similarity between the second time interval probability distribution model and the distribution feature of the probabilities of the part or all the arrival time intervals. If the similarity is high, the traffic identification device determines that the to-be-analyzed traffic is the video traffic. If the similarity is low, the traffic identification device determines that the to-be-analyzed traffic is neither the game traffic nor the video traffic.

3002: The traffic identification device determines the type of the to-be-analyzed traffic based on the fitting parameter.

For the type of the to-be-analyzed traffic, refer to related descriptions in Step 203 in the embodiment shown in FIG. 2A. Details are not described herein again.

Optionally, it can be learned from Step 3001 that the fitting parameter includes the reciprocal r of the relative entropy and/or the KS test amount p. In this case, Step 3002 includes Step 3002a to Step 3002c.

Step 3002a: The traffic identification device determines whether r is greater than the first preset threshold and whether p is less than the second preset threshold. If r is greater than the first preset threshold and p is less than the second preset threshold, Step 3002b is performed. Alternatively, if r is not greater than the first preset threshold and p is not less than the second preset threshold, Step 3002c is performed.

Figure 3C:
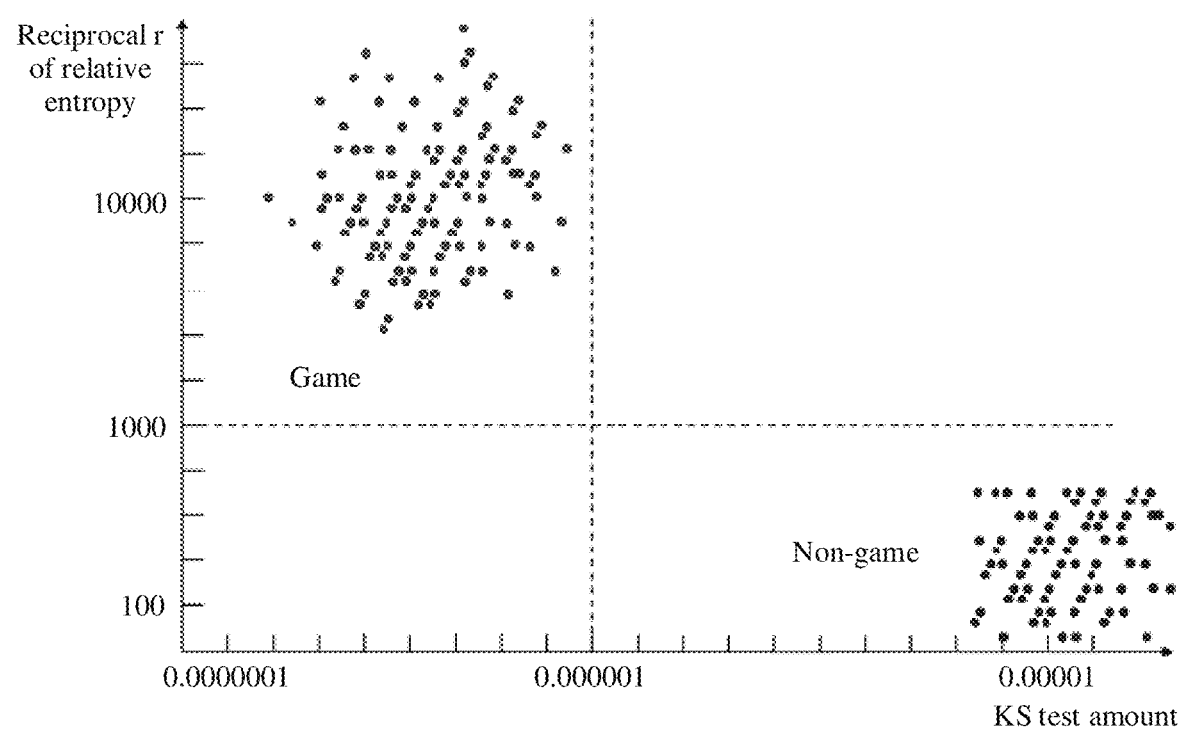
FIG. 3C is a schematic diagram of distribution of reciprocals of relative entropy and KS test amounts corresponding to to-be-analyzed traffic according to an embodiment of this application.

For example, the first preset threshold is 1000, and the second preset threshold is 0.00001. The traffic identification device determines whether r obtained through computation is greater than 1000 and whether p is less than 0.00001. If r obtained through computation is greater than 1000 and p is less than 0.00001, the traffic identification device determines that the to-be-analyzed traffic is the traffic of the first type. Alternatively, if r obtained through computation is not greater than 1000 and p is not less than 0.00001, the traffic identification device determines that the to-be-analyzed traffic is the traffic of the second type. For a specific identification result, refer to a schematic diagram shown in FIG. 3C. A horizontal coordinate is p, a vertical coordinate is r, and r and p respectively corresponding to to-be-analyzed traffic that corresponds to a plurality of data flows obtained by the traffic identification device are shown by using coordinate points (p, r). Game traffic and non-game traffic in the to-be-analyzed traffic corresponding to the plurality of data flows may be obviously determined in FIG. 3C.

It should be noted that specified values of the first preset threshold and the second preset threshold may be specifically determined by using experimental data.

Step 3002b: The traffic identification device determines that the to-be-analyzed traffic is the traffic of the first type.

Step 3002c: The traffic identification device determines that the to-be-analyzed traffic is the traffic of the second type.

In this embodiment of this application, optionally, before Step 202 in the embodiment shown in FIG. 2A, the embodiment shown in FIG. 2A further includes Step 202a to Step 202e.

Step 202a: The traffic identification device determines a first packet of the to-be-analyzed traffic.

The first packet is a packet whose arrival time interval is less than a third preset threshold in packets of the to-be-analyzed traffic. For example, the third preset threshold is 10 ms (milliseconds), and the traffic identification device uses a packet whose arrival time interval is 10 ms in the to-be-analyzed traffic as the first packet.

It should be noted that a value of the third preset threshold may be specifically determined depending on a current network transmission status. For example, when the network transmission status is good, the third preset threshold is small. Alternatively, when the network transmission status is poor, the third preset threshold is large. The network transmission status may be specifically determined by using a bandwidth and a delay of network transmission.

Step 202b: The traffic identification device determines a ratio of a quantity of the first packets to a total quantity of packets extracted from the to-be-analyzed traffic.

For example, the total quantity of the packets of the to-be-analyzed traffic is M, and a quantity of the packet whose arrival time interval is 10 ms is L. It can be learned that a ratio of the quantity of the packet whose arrival time interval is 10 ms to the total quantity of the packets of the to-be-analyzed traffic is L/M. L is an integer greater than 0 and less than M.

Step 202c: The traffic identification device determines whether the ratio is greater than a fourth preset threshold. If the ratio is greater than the fourth preset threshold, Step 202d is performed. If the ratio is not greater than the fourth preset threshold, Step 202e is performed.

For example, the fourth preset threshold is 80%, and the traffic identification device determines whether the ratio is greater than 80%. If the ratio is greater than 80%, the traffic identification device preliminarily determines that the to-be-analyzed traffic is the traffic of the first type, and the traffic identification device may further identify the to-be-analyzed traffic, to accurately identify the type of the to-be-analyzed traffic. If the ratio is not greater than 80%, the traffic identification device determines the traffic of the second type.

It should be noted that the fourth preset threshold may be set based on data of a plurality of experiments.

Step 202d: The traffic identification device triggers performing of Step 203.

When the traffic identification device determines that the ratio is greater than the fourth preset threshold, the traffic identification device performs Step 203 to further identify the to-be-analyzed traffic. A screening process in Step 202c can prevent the traffic identification device from further identifying all network traffic that flows through the traffic identification device, to improve efficiency of traffic identification.

Step 202e: The traffic identification device determines that the to-be-analyzed traffic is traffic of a second type.

In this embodiment of this application, optionally, before Step 202 in the embodiment shown in FIG. 2A, the embodiment shown in FIG. 2A further includes Step 202f to Step 202h.

Step 202f: The traffic identification device obtains historical traffic of a first type.

The historical traffic is game traffic or video traffic.

Specifically, a server labels the historical traffic, and a label indicates that the historical traffic is traffic of the first type. In this way, when receiving the historical traffic, the traffic identification device determines that the historical traffic is the traffic of the first type by using the label. A magnitude of the historical traffic is generally 1 GB to 2 GB.

Step 202g: The traffic identification device determines arrival time intervals of packets of the historical traffic and probabilities of the arrival time intervals of the packets of the historical traffic.

Step 202g is similar to Step 202 in the embodiment shown in FIG. 2A. For details, refer to related descriptions in Step 202 in the embodiment shown in FIG. 2A. Details are not described herein again.

Step 202h: The traffic identification device establishes a reference time interval probability distribution model based on the arrival time intervals of the packets of the historical traffic and the probabilities of the arrival time intervals of the packets of the historical traffic.

Specifically, the traffic identification device uses the arrival time intervals of the packets of the historical traffic as horizontal coordinates, and uses the probabilities of the arrival time intervals of the packets of the historical traffic as vertical coordinates, to obtain a distribution diagram of the probabilities of the arrival time intervals of the packets of the historical traffic. Then, the traffic identification device determines a to-be-formulated time interval probability distribution model based on the distribution diagram of the probabilities of the arrival time intervals of the packets of the historical traffic, and computes a parameter value of the to-be-formulated time interval probability distribution model. The traffic identification device substitutes the parameter value into the to-be-formulated time interval probability distribution model, to obtain the reference time interval probability distribution model. Optionally, the traffic identification device computes the parameter value of the to-be-formulated time interval probability distribution model by using a maximum likelihood estimation method.

For example, the historical traffic is game traffic of a game application "Arena of Valor". The traffic identification device uses the arrival time intervals of the packets of the historical traffic as the horizontal coordinates, and uses the probabilities of the arrival time intervals of the packets of the historical traffic as the vertical coordinates, to obtain the distribution diagram of the probabilities of the arrival time intervals of the packets of the historical traffic. Specifically, FIG. 3B is a schematic diagram of distribution of probabilities of arrival time intervals of packets of historical traffic of the game application "Arena of Valor". It can be learned from the distribution diagram of the probabilities of the time intervals shown in FIG. 3B that a distribution feature of the probabilities of the arrival time intervals of the packets of the historical traffic is consistent with the distribution feature of the power-law distribution model. The traffic identification device determines that the to-be-formulated time interval probability distribution model is the power-law distribution model. Then, the traffic identification device computes a parameter value of the power-law distribution model by using the maximum likelihood estimation method, and substitutes the parameter value into the power-law distribution model, to obtain the reference time interval distribution model.

Figure 3D:
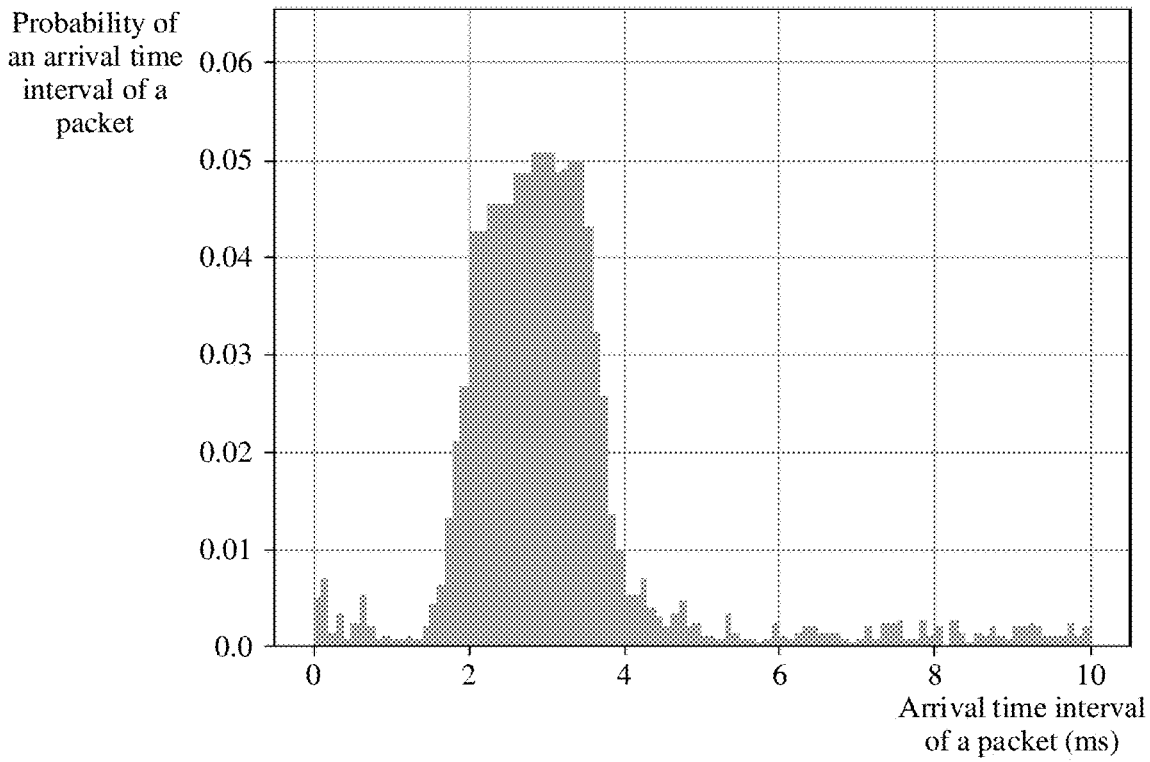
FIG. 3D is a schematic diagram of distribution of probabilities of arrival time intervals of packets of video traffic of a video application "iQIYI" according to an embodiment of this application.

For another example, the historical traffic is video traffic of a video application "iQIYI". The traffic identification device uses arrival time intervals of packets of historical traffic of the "iQIYI" as the horizontal coordinates, and uses probabilities of arrival time intervals of packets of the to-be-analyzed traffic as the vertical coordinates, to obtain a distribution diagram of the probabilities of the arrival time intervals of the packets of the to-be-analyzed traffic. Specifically, FIG. 3D is a schematic diagram of distribution of probabilities of arrival time intervals of packets of historical traffic of the video application "iQIYI". It can be learned from FIG. 3D that a distribution feature of the probabilities of the time intervals of the packets of the historical traffic is consistent with a distribution feature of the Gaussian distribution model. In this case, the traffic identification device computes a parameter value of the Gaussian distribution model by using the maximum likelihood estimation method, and then substitutes the parameter value into the Gaussian distribution model, to obtain the reference time interval distribution model.

It can be learned from the foregoing example that the distribution feature of the probabilities of the arrival time intervals of the packets of the game traffic is consistent with the distribution feature of the power-law distribution model. Therefore, when identifying game traffic, the traffic identification device can accurately determine whether the to-be-analyzed traffic is the game traffic by comparing the distribution feature of the probabilities of the arrival time intervals of the packets of the to-be-analyzed traffic with the distribution feature of the power-law distribution model. However, the distribution feature of the probabilities of the arrival time intervals of the packets of the video traffic is consistent with the distribution feature of the Gaussian distribution model. In this case, the traffic identification device can accurately determine whether the to-be-analyzed traffic is the video traffic by comparing the distribution feature of the probabilities of the arrival time intervals of the packets of the to-be-analyzed traffic with the distribution feature of the Gaussian distribution model.

Figure 4:
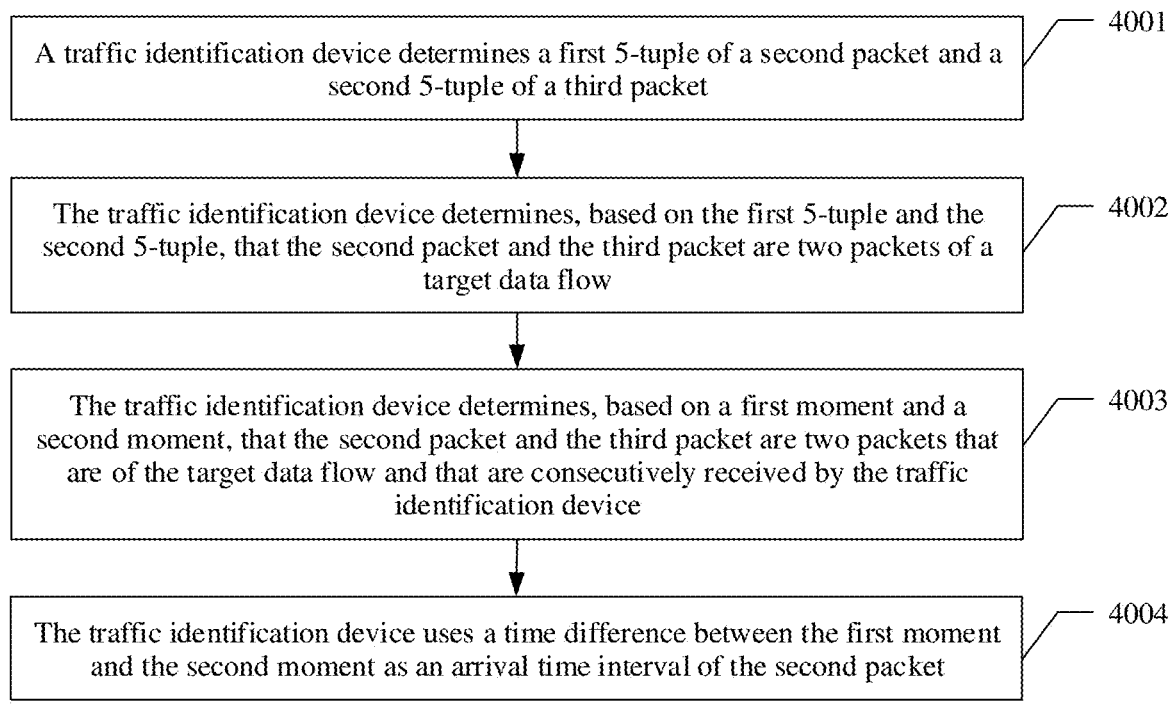
FIG. 4 is a schematic diagram of another embodiment of a traffic identification method according to an embodiment of this application.

In this embodiment of this application, optionally, Step 202 in the embodiment shown in FIG. 2A specifically includes Step 4001 to Step 4004. Specifically, FIG. 4 is a schematic diagram of another embodiment of a traffic identification method according to an embodiment of this application. The method includes the following steps.

4001: A traffic identification device determines a first 5-tuple of a second packet and a second 5-tuple of a third packet.

The first 5-tuple includes a source IP address, a destination IP address, a source port number, a destination port number, and a transmission protocol type that are of the second packet. The second 5-tuple includes a source IP address, a destination IP address, a source port number, a destination port number, and a transmission protocol type that are of the second packet.

Specifically, the traffic identification device obtains the first 5-tuple by using a packet header of the second packet and obtains the second 5-tuple by using a packet header of the third packet.

4002: The traffic identification device determines, based on the first 5-tuple and the second 5-tuple, that the second packet and the third packet are two packets of a target data flow.

4003: The traffic identification device determines, based on a first moment and a second moment, that the second packet and the third packet are two packets that are of the target data flow and that are consecutively received by the traffic identification device.

The first moment is a moment at which the traffic identification device receives the second packet. The second moment is a moment at which the traffic identification device receives the third packet.

Specifically, the traffic identification device determines, based on a time sequence in which the packets arrive at the traffic identification device, a timestamp at which the packets arrive. According to the timestamp, it may be determined that the traffic identification device receives the second packet at the first moment and receives the third packet at the second moment. Then, the traffic identification device determines, based on the timestamp, that the second packet and the third packet are the two packets that are of the target data flow and that are consecutively received by the traffic identification device.

Optionally, the third packet is a next packet of the second packet or a previous packet of the second packet. This is not specifically limited herein.

4004: The traffic identification device uses a time difference between the first moment and the second moment as an arrival time interval of the second packet.

Specifically, Step 4003 and Step 4004 may be understood with reference to the example of Step 202 in the embodiment shown in FIG. 2A. Details are not described herein again.

Figure 5:
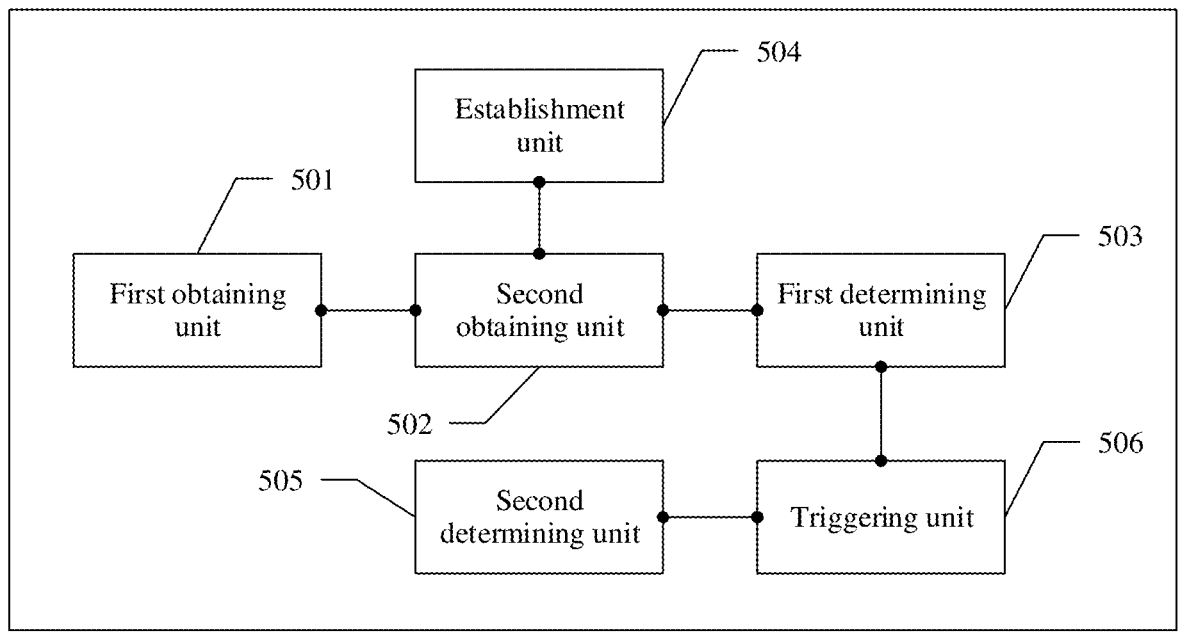
FIG. 5 is a schematic diagram of a structure of a traffic identification device according to an embodiment of this application.

The following describes a traffic identification device provided in embodiments of this application. FIG. 5 is a schematic diagram of a structure of a traffic identification method according to an embodiment of this application. The traffic identification device may be configured to perform the steps performed by the traffic identification device in the embodiments shown in FIG. 2A, FIG. 3A, and FIG. 4. For details, refer to related descriptions in the foregoing method embodiments.

The traffic identification device includes a first obtaining unit 501, a second obtaining unit 502, and a first determining unit 503. Optionally, the traffic identification device further includes an establishment unit 504, a second determining unit 505, and a triggering unit 506.

The first obtaining unit 501 is configured to obtain to-be-analyzed traffic of a target data flow.

The second obtaining unit 502 is configured to obtain arrival time intervals of packets of the to-be-analyzed traffic.

The first determining unit 503 is configured to determine a type of the to-be-analyzed traffic based on a distribution feature of probabilities of a part or all of the arrival time intervals.

In a possible implementation, the first determining unit 503 is specifically configured to: determine the type of the to-be-analyzed traffic based on a similarity between the distribution feature of the probabilities of the part or all of the arrival time intervals and a distribution feature of probabilities of arrival time intervals of packets of historical traffic of a first type.

In another possible implementation, the first determining unit 503 is specifically configured to: determine, when the similarity is higher than a first similarity, that the to-be-analyzed traffic is traffic of a first type.

In another possible implementation, the similarity is represented by a fitting degree between the distribution feature of the probabilities of the part or all of the arrival time intervals and a reference time interval probability distribution model. The reference time interval probability distribution model is used to represent the distribution feature of the probabilities of the arrival time intervals of the packets of the historical traffic of the first type. The first determining unit 503 is specifically configured to: determine that the to-be-analyzed traffic is the traffic of the first type when the fitting degree is higher than a first fitting degree.

In another possible implementation, the fitting degree is represented by using a reciprocal of relative entropy and a KS test amount. When the reciprocal of the relative entropy is equal to a first preset threshold and the KS test amount is equal to a second preset threshold, the fitting degree is the first fitting degree. When the reciprocal of the relative entropy is greater than the first preset threshold and the KS test amount is less than the second preset threshold, the fitting degree is higher than the first fitting degree.

In another possible implementation, the first determining unit 503 is specifically configured to: compute a fitting parameter based on the part or all of the arrival time intervals, the probabilities of the part or all of the arrival time intervals, and the reference time interval probability distribution model, where the reference time interval probability distribution model is used to represent the distribution feature of the probabilities of the arrival time intervals of the packets of the historical traffic of the first type, and the fitting parameter is used to indicate the fitting degree between the distribution feature of the probabilities of the part or all of the arrival time intervals and the reference time interval probability distribution model; and determine the type of the to-be-analyzed traffic based on the fitting parameter.

In another possible implementation, the fitting parameter includes the reciprocal of the relative entropy and the Kolmogorov-Smirnov (KS) test amount. The first determining unit 503 is specifically configured to: determine that the to-be-analyzed traffic is the traffic of the first type when the traffic identification device determines that the reciprocal of the relative entropy is greater than the first preset threshold and the KS test amount is less than the second preset threshold.

In another possible implementation, the traffic of the first type is game traffic or video traffic.

In another possible implementation, the first obtaining unit 501 is further configured to: obtain the historical traffic of the first type.

The second obtaining unit 502 is further configured to: obtain the arrival time intervals of the packets of the historical traffic and the probabilities of the arrival time intervals of the packets of the historical traffic.

The establishment unit 504 is configured to establish the reference time interval probability distribution model based on the arrival time intervals of the packets of the historical traffic and the probabilities of the arrival time intervals of the packets of the historical traffic.

In another possible implementation, the reference time interval probability distribution model includes any one of the following: a power-law distribution model, a Gaussian distribution model, a normal distribution model, and a Poisson distribution model.

In another possible implementation, when the first determining unit 503 determines the type of the to-be-analyzed traffic based on the distribution feature of the probabilities of the part of the arrival time intervals, the part of the arrival time intervals are arrival time intervals that are less than a third preset threshold in the arrival time intervals of the packets of the to-be-analyzed traffic.

In another possible implementation, the second determining unit 505 is configured to: determine a first packet of the to-be-analyzed traffic, where an arrival time interval of the first packet is less than the third preset threshold; and determine a ratio of a quantity of the first packets to a total quantity of packets included in the to-be-analyzed traffic.

The triggering unit 506 is configured to: when the traffic identification device determines that the ratio is greater than a fourth preset threshold, trigger the first determining unit 503 to perform the step of determining the type of the to-be-analyzed traffic based on the distribution feature of the probabilities of the part or all of the arrival time intervals.

In this embodiment of this application, the first obtaining unit 501 obtains the to-be-analyzed traffic of the target data flow. Then, the second obtaining unit 502 obtains the arrival time intervals of the packets of the to-be-analyzed traffic. The first determining unit 503 determines the type of the to-be-analyzed traffic based on the distribution feature of the probabilities of the part or all of the arrival time intervals. Distribution of probabilities of arrival time intervals of packets of traffic of each type has a specific distribution rule. Therefore, the first determining unit 503 can accurately identify the type of the to-be-analyzed traffic based on the distribution feature of the probabilities of the arrival time intervals of the packets of the to-be-analyzed traffic. For example, when the distribution feature of the probabilities of all or the part of the arrival time intervals of the packets of the to-be-analyzed traffic is consistent with a distribution feature of probabilities of packets of the game traffic, the first determining unit 503 can determine that the to-be-analyzed traffic is the game traffic, to accurately identify the game traffic and improve the accuracy of identification on the game traffic.

Figure 6:
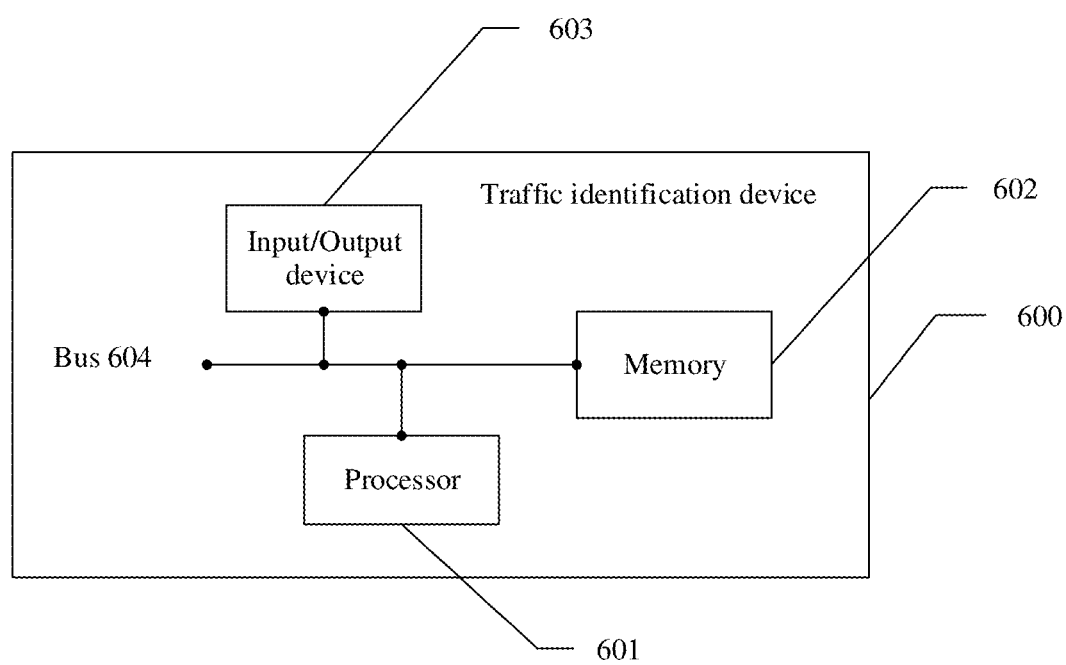
FIG. 6 is a schematic diagram of another structure of a traffic identification device according to an embodiment of this application.

Embodiments of this application further provide a traffic identification device 600. FIG. 6 is a schematic diagram of another structure of a traffic identification device according to an embodiment of this application. The traffic identification device is configured to perform the steps performed by the traffic identification device in the embodiments shown in FIG. 2A, FIG. 3A, and FIG. 4. For details, refer to related descriptions in the foregoing method embodiments.

The traffic identification device 600 includes a processor 601, a memory 602, an input/output device 603, and a bus 604.

In a possible implementation, the processor 601, the memory 602, and the input/output device 603 are separately connected to the bus 604, and the memory stores computer instructions.

The input/output device 603 is configured to obtain to-be-analyzed traffic of a target data flow.

The processor 601 is configured to: obtain arrival time intervals of packets of the to-be-analyzed traffic; and determine a type of the to-be-analyzed traffic based on a distribution feature of probabilities of a part or all of the arrival time intervals.

In a possible implementation, the processor 601 is specifically configured to: determine the type of the to-be-analyzed traffic based on a similarity between the distribution feature of the probabilities of the part or all of the arrival time intervals and a distribution feature of probabilities of arrival time intervals of packets of historical traffic of a first type.

In another possible implementation, the processor 601 is specifically configured to: determine, when the similarity is higher than a first similarity, that the to-be-analyzed traffic is traffic of a first type.

In another possible implementation, the similarity is represented by a fitting degree between the distribution feature of the probabilities of the part or all of the arrival time intervals and a reference time interval probability distribution model. The reference time interval probability distribution model is used to represent the distribution feature of the probabilities of the arrival time intervals of the packets of the historical traffic of the first type. The processor 601 is specifically configured to: determine that the to-be-analyzed traffic is the traffic of the first type when the fitting degree is higher than a first fitting degree.

In another possible implementation, the fitting degree is represented by using a reciprocal of relative entropy and a KS test amount. When the reciprocal of the relative entropy is equal to a first preset threshold and the KS test amount is equal to a second preset threshold, the fitting degree is the first fitting degree. When the reciprocal of the relative entropy is greater than the first preset threshold and the KS test amount is less than the second preset threshold, the fitting degree is higher than the first fitting degree.

In another possible implementation, the processor 601 is specifically configured to: compute a fitting parameter based on the part or all of the arrival time intervals, the probabilities of the part or all of the arrival time intervals, and the reference time interval probability distribution model, where the reference time interval probability distribution model is used to represent the distribution feature of the probabilities of the arrival time intervals of the packets of the historical traffic of the first type, and the fitting parameter is used to indicate the fitting degree between the distribution feature of the probabilities of the part or all of the arrival time intervals and the reference time interval probability distribution model; and determine the type of the to-be-analyzed traffic based on the fitting parameter.

In another possible implementation, the fitting parameter includes the reciprocal of the relative entropy and the Kolmogorov-Smirnov KS test amount. The processor 601 is specifically configured to: determine that the to-be-analyzed traffic is the traffic of the first type when the traffic identification device determines that the reciprocal of the relative entropy is greater than the first preset threshold and the KS test amount is less than the second preset threshold.

In another possible implementation, the traffic of the first type is game traffic or video traffic.

In another possible implementation, the input/output device 603 is further configured to: obtain the historical traffic of the first type.

The processor 601 is further configured to: obtain the arrival time intervals of the packets of the historical traffic and the probabilities of the arrival time intervals of the packets of the historical traffic; and establish the reference time interval probability distribution model based on the arrival time intervals of the packets of the historical traffic and the probabilities of the arrival time intervals of the packets of the historical traffic.

In another possible implementation, the reference time interval probability distribution model includes any one of the following: a power-law distribution model, a Gaussian distribution model, a normal distribution model, and a Poisson distribution model.

In another possible implementation, when the processor 601 determines the type of the to-be-analyzed traffic based on the distribution feature of the probabilities of the part of the arrival time intervals, the part of the arrival time intervals are arrival time intervals that are less than a third preset threshold in the arrival time intervals of the packets of the to-be-analyzed traffic.

In another possible implementation, the input/output device 603 is further configured to: determine a first packet of the to-be-analyzed traffic, where an arrival time interval of the first packet is less than the third preset threshold; and determine a ratio of a quantity of the first packets to a total quantity of packets included in the to-be-analyzed traffic.

The processor 601 is further configured to: when the traffic identification device determines that the ratio is greater than a fourth preset threshold, trigger performing of the step of determining the type of the to-be-analyzed traffic based on the distribution feature of the probabilities of the part or all of the arrival time intervals.

In this embodiment of this application, the input/output device 603 obtains to-be-analyzed traffic of the target data flow. Then, the processor 601 obtains the arrival time intervals of the packets of the to-be-analyzed traffic, and determines the type of the to-be-analyzed traffic based on the distribution feature of the probabilities of the part or all of the arrival time intervals. Distribution of probabilities of arrival time intervals of packets of traffic of each type has a specific distribution rule, therefore, the processor 601 can accurately identify the type of the to-be-analyzed traffic based on the distribution feature of the probabilities of the arrival time intervals of the packets of the to-be-analyzed traffic. For example, when the distribution feature of the probabilities of all or the part of the arrival time intervals of the packets of the to-be-analyzed traffic is consistent with a distribution feature of probabilities of packets of the game traffic, the processor 601 can determine that the to-be-analyzed traffic is the game traffic, to accurately identify the game traffic and improve the accuracy of identification on the game traffic.

Embodiments of this application further provide a computer program product including instructions. When the computer program product runs on a computer, the computer is enabled to perform the traffic identification methods in the embodiments shown in FIG. 2A, FIG. 3A, and FIG. 4.

Embodiments of this application further provide a computer-readable storage medium including instructions. When the instructions are run on a computer, the computer is enabled to perform the traffic identification methods in the embodiments shown in FIG. 2A, FIG. 3A, and FIG. 4.

In another possible design, when the traffic identification device is a chip in a terminal, the chip includes a processing unit and a communication unit. The processing unit may be, for example, a processor, and the communication unit may be, for example, an input/output interface, a pin, or a circuit. The processing unit may execute computer-executable instructions stored in a storage unit, so that the chip in the terminal performs the traffic identification methods in the embodiments shown in FIG. 2A, FIG. 3A, and FIG. 4. Optionally, the storage unit is a storage unit in the chip, for example, a register or a cache. Alternatively, the storage unit may be a storage unit that is in the terminal and that is located outside the chip, for example, a read-only memory (ROM), another type of static storage device that can store static information and instructions, or a random access memory (RAM).

The processor mentioned anywhere above may be a general-purpose central processing unit, a microprocessor, an application-specific integrated circuit (ASIC), or one or more integrated circuits configured to control program execution of the traffic identification methods in the embodiments shown in FIG. 2A, FIG. 3A, and FIG. 4.

It may be clearly understood by a person skilled in the art that, for the purpose of convenient and brief description, for a detailed working process of the foregoing systems, apparatuses, and units, refer to a corresponding process in the foregoing method embodiments. Details are not described herein again.

In the several embodiments provided in this application, it should be understood that the disclosed systems, apparatuses, and methods may be implemented in other manners. For example, the foregoing described apparatus embodiments are merely examples. For example, division of the units is merely a logical function division and may be another division during actual implementation. For example, a plurality of units or components may be combined or integrated into another system, or some features may be ignored or may not be performed. In addition, the displayed or discussed mutual coupling or direct coupling or communication connection may be implemented through direct coupling or communication connection between some interfaces, apparatuses or units, or may be implemented in electrical, mechanical, or other forms.

The units described as separate components may or may not be physically separate, and components displayed as units may or may not be physical units. To be specific, the components may be located at one location, or may be distributed on a plurality of network units. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The foregoing integrated unit may be implemented in a form of hardware, or may be implemented in a form of a software functional unit.

When being implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium, and includes a plurality of instructions for instructing a computer device (which may be, for example, a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In this application, the terms such as "first" and "second" are used to distinguish between same or similar items whose effects and functions are basically the same. It should be understood that there is no logical or time-sequence dependency between "first", "second", and "$n^{th}$", and a quantity and an execution sequence are not limited, either. It should be further understood that although the terms such as "first" and "second" are used in the following descriptions to describe various elements, these elements should not be limited by the terms. These terms are merely used to distinguish one element from another element. For example, without departing from the scope of the various examples, a first image may be referred to as a second image, and similarly, a second image may be referred to as a first image. Both the first image and the second image may be images, and in some cases, may be separate and different images.

The term "at least one" in this application means one or more, and the term "a plurality of" in this application means two or more than two. For example, "a plurality of second packets" means two or more than two second packets. The terms "system" and "network" may be used interchangeably in this specification.

It should be understood that the terms used in the descriptions of the various examples in this specification are merely intended to describe specific examples, but are not intended to constitute a limitation. As used in the descriptions of the various examples and the appended claims, the singular forms "one ("a", "an")" and "the" are intended to also include plural forms, unless otherwise explicitly indicated in the context.

It should further be understood that, the term "and/or" used in this specification indicates and includes any or all possible combinations of one or more items in associated listed items. The term "and/or" describes an association relationship between associated objects and represents that three relationships may exist. For example, A and/or B may represent the following three cases: Only A exists, both A and B exist, and only B exists. In addition, the character "/" in this application generally indicates an "or" relationship between associated objects.

It should be further understood that sequence numbers of processes do not mean execution sequences in various embodiments of this application. The execution sequences of the processes should be determined based on functions and internal logic of the processes, and should not be construed as any limitation on the implementation processes of embodiments of this application.

It should be understood that determining B based on A does not mean that B is determined based on only A, but B may alternatively be determined based on A and/or other information.

It should be further understood that the term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or their components not excluded.

It should be further understood that the term "if" may be interpreted as a meaning "when" ("when" or "upon"), "in response to determining", or "in response to detecting". Similarly, according to the context, the phrase "if it is determined that" or "if (a stated condition or event) is detected" may be interpreted as a meaning of "when it is determined that" or "in response to determining" or "when (a stated condition or event) is detected" or "in response to detecting (a stated condition or event)".

It should be understood that "one embodiment", "an embodiment", and "a possible implementation" mentioned in the entire specification mean that particular features, structures, or characteristics related to the embodiment or the implementation are included in at least one embodiment of this application. Therefore, "in one embodiment", "in an embodiment", or "in a possible implementation" appearing throughout this specification does not necessarily mean a same embodiment. In addition, these particular features, structures, or characteristics may be combined in one or more embodiments by using any appropriate manner.

The foregoing embodiments are merely intended to describe the technical solutions of this application, but are not intended to limit this application. Although this application is described in detail with reference to the foregoing embodiments, a person of ordinary skill in the art should understand that the technical solutions described in the foregoing embodiments may still be modified or some technical features thereof may be equivalently replaced. These modifications or replacements do not enable essence of a corresponding technical solution to depart from the spirit and scope of the technical solutions of embodiments of this application.

What is claimed is:

1. A method, comprising:
   obtaining, by a traffic identification device, historical network traffic of a first type;
   obtaining, by the traffic identification device, arrival time intervals of packets of the historical network traffic of the first type and probabilities of the arrival time intervals of the packets of the historical network traffic of the first type; and
   establishing, by the traffic identification device, a reference time interval probability distribution model of the first type based on the arrival time intervals of the packets of the historical network traffic of the first type and the probabilities of the arrival time intervals of the packets of the historical network traffic of the first type, comprising:
      determining a type of model corresponding to the historical network traffic of the first type;
      computing a parameter value of the model corresponding to the historical network traffic of the first type using a maximum likelihood estimation method; and
      substituting the parameter value into the model corresponding to the historical network traffic of the first type, to obtain the reference time interval probability distribution model of the first type;
   obtaining, by the traffic identification device, to-be-analyzed traffic of a target data flow;
   measuring, by the traffic identification device, arrival time intervals of packets of the to-be-analyzed traffic;
   determining, by the traffic identification device, a service type of the to-be-analyzed traffic based on a similarity between a distribution feature of probabilities of a part or all of the arrival time intervals and a distribution feature of the reference time interval probability distribution model of the first type; and
   performing service assurance based on a priority of the service type.

2. The method according to claim 1, wherein determining, by the traffic identification device, the service type of the to-be-analyzed traffic based on the similarity between the distribution feature of the probabilities of the part or all of the arrival time intervals and the distribution feature of the reference time interval probability distribution model of the first type comprises:
   computing, by the traffic identification device, a fitting parameter based on the part or all of the arrival time intervals, the probabilities of the part or all of the arrival time intervals, and the reference time interval probability distribution model, wherein the fitting parameter indicates a fitting degree between the distribution feature of the probabilities of the part or all of the arrival time intervals and the reference time interval probability distribution model; and
   determining, by the traffic identification device, the service type of the to-be-analyzed traffic based on the fitting parameter.

3. The method according to claim 2, wherein the fitting parameter comprises a reciprocal of relative entropy and a Kolmogorov-Smirnov (KS) test amount; and
   wherein determining, by the traffic identification device, the service type of the to-be-analyzed traffic based on the fitting parameter comprises:
      determining, by the traffic identification device when the traffic identification device determines that the reciprocal of the relative entropy is greater than a first preset threshold and the KS test amount is less than a second preset threshold, that the to-be-analyzed traffic is traffic of the first type.

4. The method according to claim 3, wherein the traffic of the first type is game traffic.

5. The method according to claim 1, wherein the reference time interval probability distribution model comprises a power-law distribution model.

6. The method according to claim 5, wherein when the traffic identification device determines the service type of the to-be-analyzed traffic based on the distribution feature of the probabilities of the part of the arrival time intervals, the part of the arrival time intervals are arrival time intervals that are less than a third preset threshold in the arrival time intervals of the packets of the to-be-analyzed traffic.

7. The method according to claim 6, further comprising:
   determining, by the traffic identification device, first packets of the to-be-analyzed traffic, wherein an arrival time interval of the first packets is less than the third preset threshold;
   determining, by the traffic identification device, a ratio of a quantity of the first packets to a total quantity of packets comprised in the to-be-analyzed traffic; and
   when the traffic identification device determines that the ratio is greater than a fourth preset threshold, triggering performing of the determining, by the traffic identification device, the service type of the to-be-analyzed traffic based on the distribution feature of probabilities of the part or all of the arrival time intervals.

8. The method according to claim 3, wherein the traffic of the first type is video traffic.

9. A device, comprising:
   at least one processor; and
   a non-transitory computer readable storage medium storing a program that is executable by the at least one processor, the program including instructions to:
      obtain historical network traffic of a first type;
      obtain arrival time intervals of packets of the historical network traffic of the first type and probabilities of the arrival time intervals of the packets of the historical network traffic of the first type; and
      establish a reference time interval probability distribution model of the first type based on the arrival time intervals of the packets of the historical network traffic of the first type and the probabilities of the arrival time intervals of the packets of the historical network traffic of the first type, comprising:
         determining a type of model corresponding to the historical network traffic of the first type;
         computing a parameter value of the model corresponding to the historical network traffic of the first type using a maximum likelihood estimation method; and
         substituting the parameter value into the model corresponding to the historical network traffic of the first type, to obtain the reference time interval probability distribution model of the first type;

obtain to-be-analyzed traffic of a target data flow;

measure arrival time intervals of packets of the to-be-analyzed traffic;

determine a service type of the to-be-analyzed traffic based on a similarity between a distribution feature of probabilities of a part or all of the arrival time intervals and a distribution feature of the reference time interval probability distribution model of the first type; and perform service assurance based on a priority of the service type.

10. The device according to claim 9, wherein the program includes instructions to:

compute a fitting parameter based on the part or all of the arrival time intervals, the probabilities of the part or all of the arrival time intervals, and the reference time interval probability distribution model, wherein the fitting parameter indicates a fitting degree between the distribution feature of the probabilities of the part or all of the arrival time intervals and the reference time interval probability distribution model; and determine the service type of the to-be-analyzed traffic based on the fitting parameter.

11. The device according to claim 10, wherein the fitting parameter comprises a reciprocal of relative entropy and a Kolmogorov-Smirnov (KS) test amount; and wherein the program includes instructions to:

determine, when the device determines that the reciprocal of the relative entropy is greater than a first preset threshold and the KS test amount is less than a second preset threshold, that the to-be-analyzed traffic is traffic of the first type.

12. The device according to claim 11, wherein the traffic of the first type is game traffic.

13. The device according to claim 9, wherein the reference time interval probability distribution model comprises a power-law distribution model.

14. The device according to claim 13, wherein when determining the service type of the to-be-analyzed traffic based on the distribution feature of the probabilities of the part of the arrival time intervals, the part of the arrival time intervals are arrival time intervals that are less than a third preset threshold in the arrival time intervals of the packets of the to-be-analyzed traffic.

15. The device according to claim 14, wherein the program includes instructions to:

determine first packets of the to-be-analyzed traffic, wherein an arrival time interval of the first packets is less than the third preset threshold;

determine a ratio of a quantity of the first packets to a total quantity of packets comprised in the to-be-analyzed traffic; and when it is determined that the ratio is greater than a fourth preset threshold, trigger performing the determining the service type of the to-be-analyzed traffic based on the distribution feature of the probabilities of the part or all of the arrival time intervals.

16. The device according to claim 11, wherein the traffic of the first type is video traffic.

17. The method according to claim 1, wherein the reference time interval probability distribution model comprises a Gaussian distribution model.

18. The method according to claim 1, wherein the reference time interval probability distribution model comprises a normal distribution model, or a Poisson distribution model.

19. The device according to claim 9, wherein the reference time interval probability distribution model comprises a Gaussian distribution model.

20. The device according to claim 9, wherein the reference time interval probability distribution model comprises a normal distribution model, or a Poisson distribution model.

* * * * *